Sept. 21, 1965
I. E. COX
3,206,780
SHOE STRETCHER
Filed Oct. 30, 1964
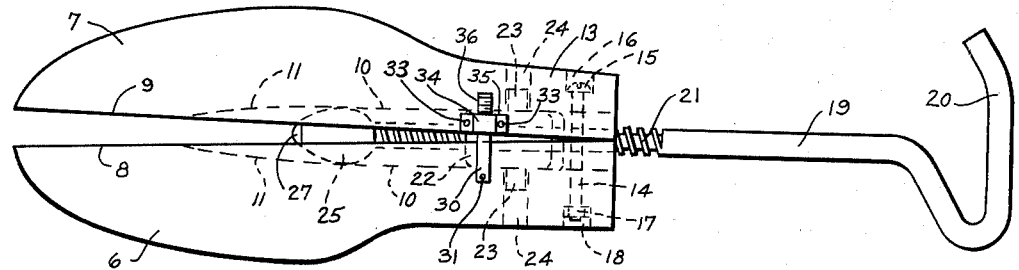
Fig. 1.
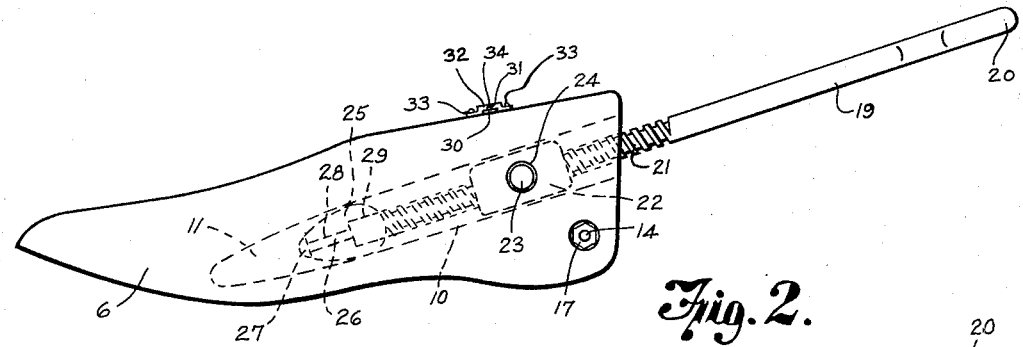
Fig. 2.
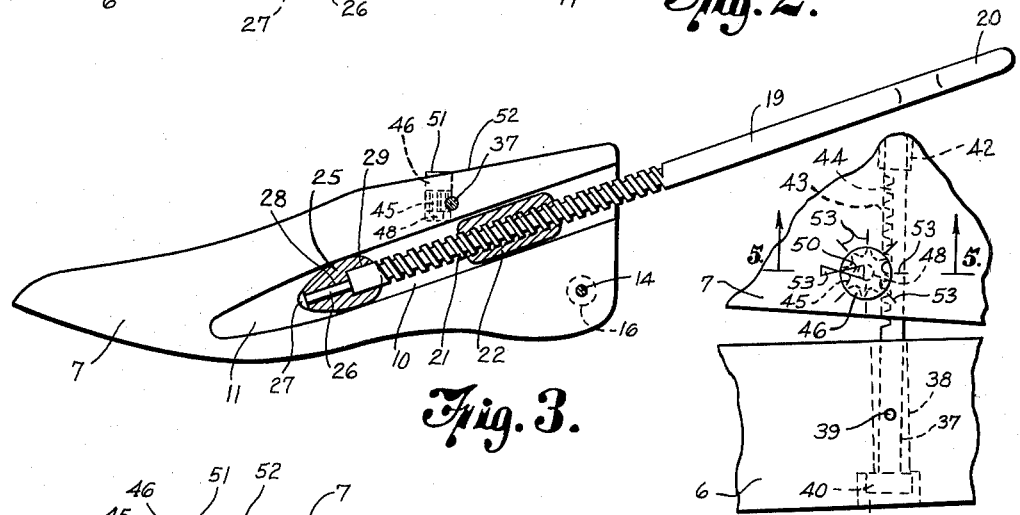
Fig. 3.
Fig. 4.
Fig. 5.
INVENTOR.
IVAN E. COX
BY
Alfred R. Fuchs
ATTORNEY

United States Patent Office 3,206,780
Patented Sept. 21, 1965

3,206,780
SHOE STRETCHER
Ivan E. Cox, 4740 Broadway, Kansas City, Mo.
Filed Oct. 30, 1964, Ser. No. 407,718
3 Claims. (Cl. 12—116.2)

My invention relates to a shoe stretcher, and more particularly to a shoe stretcher that is provided with suitable means for indicating the adjustment thereof.

In the stretching of shoes it is desirable that both the left and the right shoe be stretched the same amount. While shoe stretchers have been made to be used in pairs, one to conform in shape to the forward portion of the right shoe and the other to conform to the forward portion of the left shoe, it has been difficult to adjust a pair of shoe stretchers so as to stretch both shoes of a pair the same amount, because no suitable readily readable indicating means for the adjustment of each thereof has been provided.

It is a purpose of my invention to provide shoe stretchers with adjustment indicating means of such a character that they will accurately indicate the adjustment thereof in a convenient manner. A suitable scale or other suitable indicating means is preferably provided in order to indicate the amount of stretching of a shoe by the adjustment of the stretcher in accordance with the indicating means. Preferably the indicating means includes a scale that indicates the amount of stretch that is obtained either by size or fractions thereof.

More specifically my invention comprises a shoe stretcher that is made up of a body portion that conforms substantiall to the shape of the forward portion of a shoe, which is made up of a pair of halves that are adjustable toward and away from each other by suitable means, and to provide means for indicating the adjustment of the width of the body portion, comprising a member pivotally mounted on one of the halves against endwise movement lengthwise of itself relative to said half and guiding means on the other half of the body portion slidably engaged by said member to hold said member in a transverse position with respect to the body portion, and to provide means on the two halves of the body portion of the stretcher that will cooperate to indicate the adjustment of the stretcher, dependent upon the amount of movement of said member.

It is a further purpose of my invention to provide such means for indicating the adjustment of such a shoe stretcher, comprising a bar that is pivotally mounted at one end on one of said halves of the body portion of the stretcher and which slidably engages guiding means on the other half of said body portion, said bar being provided with indicia thereon cooperating with a suitable index on the guiding means for indicating the adjustment of the stretcher.

It is a further purpose of my invention to provide means for indicating the adjustment of the stretcher comprising a bar pivotally mounted on one of the halves of the body portion and engaging guiding means on the other half of the body portion, which bar is provided with teeth thereon that engage teeth on a rotatable member, which is provided with suitable means thereon for indicating the adjustment of the stretcher.

It is also a purpose of my invention to provide indicating means that are so located that the same can be easily read to determine the adjustment of the stretcher when the stretcher is in the shoe in adjusted position. In the case of the bar that carries the indicia, it is preferably mounted on the top side of the body portion near the rear thereof and in the case of the rotatable indicating member, it is preferably mounted so that it projects through the top side of the body portion and cooperates with indicia that are provided on the top face of the body portion in such a position that the indicating means can be easily read while the stretcher is in position in the shoe.

Other objects and advantages of my invention will appear as the description of the drawings proceeds. I desire to have it understood, however, that I do not intend to limit myself to the particular details shown or described, except as defined in the claims.

In the drawings:

FIG. 1 is a top plan view of my improved shoe stretcher, showing the shoe stretcher that is used for the right shoe.

FIG. 2 is a side elevation thereof.

FIG. 3 is a view partly in longitudinal section and partly in elevation of a modification.

FIG. 4 is a fragmentary detail view on an enlarged scale of the operating means for the indicating means shown in FIG. 3, and FIG. 5 is a fragmentary vertical sectional view taken substantially on the line 5—5 of FIG. 4.

Referring in detail to the drawings, in FIG. 1 is shown a shoe stretcher having a body portion made up of the halves 6 and 7, which body portion conforms substantially to the shape of the forward portion of a shoe, the particular stretcher shown in FIG. 1 being of a shape to conform substantially to that of a right shoe. Said halves 6 and 7 are provided with adjacent opposed edges 8 and 9 when the parts are assembled to form the body portion of the stretcher and each of said adjacent edges is provided with a groove extending longitudinally thereof, which has a portion 10 of substantially uniform radius and a tapering forward portion 11, said grooves opening toward each other. The rear portions 12 and 13 of the halves 6 and 7 are secured together so as to be held against movement away from each other by means of a headed fastening element 14, which has a head 15 seated in a recess 16 in the rear portion 13 of the half 7 and has a nut 17 screw-threadedly engaged therewith mounted in the recess 18 and the rear portion 12 of the half 6.

An adjusting member 19 having a rod-like shank portion terminating in a crank handle 20 is provided with a screw-threaded portion 21, which is adapted to engage with an internally screw-threaded bore in a block 22 mounted in the groove portions 10 and having bosses 23 thereon that extend into transverse passages 24 in the halves 6 and 7 to hold the block against movement lengthwise of the body portion of the stretcher. A conical wedging member 25 is mounted on the forward end of the rod-like adjusting member 19, said rod-like member having a reduced end portion 26, which is provided with a head 27 thereon for mounting the wedging member on the rod-like member 19, said conical wedging member having a reduced bore 28 for receiving the reduced end portion of the rod-like member and a larger bore 29 for receiving the end of the rod-like member 19 adjacent said reduced portion 26. It will accordingly be seen that the reduced portion 26 of the rod-like member and the reduced portion 28 of the passage through the conical wedging member provide cooperating shoulders, which, together with said head 27, hold said wedging member from endwise movement with respect to the rod-like member 19.

Due to the holding action of the transverse securing member 14 at the rear of the body portion of the stretcher, rotation of the crank 20 to advance the wedging member 25 toward the left in FIGS. 1 and 2 causes the halves 6 and 7 to be separated due to the engagement of the wedging member with the walls of the groove portions 10 and 11 as said wedging member moves toward the left in said figure to thus increase the width of the body portion of the stretcher.

Referring to FIGS. 1 and 2, a flat bar 30 of uniform width is shown as being mounted on the half 6 of the body portion by means of a pivot pin 31. Said bar extends across the joint between the two halves 6 and 7 of the body portion and engages slidably with a bracket 32 mounted on the half 7 of the body portion. Said bracket 32 is secured in fixed position on the half 7 of said body portion by means of suitable fastening elements 33, and has an upwardly offset mid-portion 34 defining a rectangular opening between said offset portion and the top surface of the half 7 of the body portion slidably receiving the bar 30 to guide the same in its movements. The offset portion 34 has a straight transverse edge 35 and the bar 30 has indicia 36 thereon cooperating with said transverse edge 35 to indicate the amount of adjustment of the stretcher, or in other words, the amount of separation of the halves 6 and 7, the indicia 36 being of such a character as to indicate sizes or fractions of sizes, as may be found desirable. It is, of course, to be understood that each of the two stretchers of a pair are provided with the indicating means comprising the bar 30 and the bracket 32 having the straight transverse edge portion 35.

In the form of the invention shown in FIGS. 3 to 5 inclusive, the parts of the body portion of the stretcher are indicated by the same reference numerals as in FIGS. 1 and 2 and the operating means for adjusting the stretcher are the same as the shown in FIGS. 1 and 2 and are provided with the same reference numerals for corresponding parts thereof. The means for indicating the adjustment of the stretcher shown in FIGS. 3 to 5 inclusive, comprises a bar 37 which is mounted in a transverse opening 38 in the half 6 of the body portion of the stretcher, said opening 38 being considerably larger in bore than the bar 37. Said bar is mounted on the half of the body portion 6 by means of a pivot pin 39 and has a head 40 that is seated in a recess 41 in said half 6, which is of larger diameter than the opening 38. Said bar 37 extends across the joint between the two halves 6 and 7 of the body portion and is slidably engaged in a guide sleeve 42 mounted in the half 7 of the body portion. The bar 37 extends through a bore 43 in said half 7 in which the guide sleeve 42 is mounted, extending from the face of said half 7 adjacent the half 6 to said sleeve 42.

The bar 37 is provided with gear teeth 44 on one side thereof, which engage teeth 45 on a rotatable member 46, which is mounted in a vertical opening 47 in the half 7 of said body portion, said opening 47 intersecting the opening 43. Said rotatable member 46 has a reduced downward extension 48 rotatably mounted in a bearing member 49 in the opening 47 and has indicating means 50 on the top face 51 thereof, which rotatable member extends to the open top of the opening 47 and said top face 51 is substantially flush with the top surface 52 of the half 7 of the body portion. Suitable indicia 53 are preferably provided on the top face of the half 7 of the body portion cooperating with the indicating means 50 to indicate the adjustment of the stretcher. It will be obvious that the amount of separation of the halves 6 and 7 of the stretcher will be indicated by means of the rotatable indicating member 46 having the indicating means 50 thereon, as the amount of rotation of the member 46 will be in proportion to the relative movement of the bar 37 and the half 7 of the stretcher.

It will be noted that is both forms of the invention the movement of the indicating means will be accurately related directly to the movement of the two halves of the stretcher relative to each other and thus will accurately indicate the amount of stretch produced thereby. Also it will be noted that the indicating means is so located that it can be easily read by the person adjusting the stretcher, while the stretcher, in the shoe, is being adjusted to obtain the desired amount of the stretch of the shoe being operated on.

What I claim is:

1. A shoe stretcher having a body portion comprising a pair of transversely adjacent halves, means securing said halves against relative movement transversely of said body portion adjacent the rear end thereof, said halves being relatively movable tranversely of said body portion forwardly of said securing means, means mounted between said halves for adjusting the transverse spacing thereof to vary the transverse dimension of said body portion, and means mounted on said body portion near the rear end thereof for indicating the adjustment of said body portion comprising a pivot member mounted in fixed position on one of said halves, a bar mounted on said pivot member for swinging movement about the same on a fixed axis, and guiding means on the other half transversely opposite said pivot member slidably engaged by said bar to mount said bar transversely across said body portion near the rear end thereof for movement transversely of said other half thereof.

2. The shoe stretcher as claimed in claim 1 in which the bar has a flat face having indicia thereon and the guiding means has a transverse portion extending across said flat face having a transverse straight edge thereon cooperating with said indicia to indicate said adjustment.

3. The shoe stretcher as claimed in claim 1 in which the bar has gear teeth thereon, and said means for indicating the adjustment of said body portion includes an indicating member, means on said other half of said body portion for rotatably mounting said indicating member thereon and gear teeth on said indicating member meshing with said gear teeth on said bar to rotate said indicating member upon movement of said bar endwise of itself relative to said indicating member.

References Cited by the Examiner

UNITED STATES PATENTS

| | | | |
|---|---|---|---|
| 319,585 | 6/85 | Jones | 12—116.2 |
| 807,917 | 12/05 | Engelhordt et al. | 12—114.2 |
| 999,306 | 8/11 | Heuyard | 12—116.2 |
| 1,302,410 | 4/19 | Murray | 12—116.2 |
| 1,415,537 | 5/22 | Elmstrom | 12—116.2 |
| 1,439,488 | 12/22 | Selden | 12—116.2 |
| 1,992,153 | 2/35 | Bliss | 12—116.2 X |
| 2,424,669 | 7/47 | Rinnela | 12—116.2 |
| 2,511,366 | 6/50 | Muzinich | 12—116.2 |
| 2,714,217 | 8/55 | Dore | 12—115.8 X |
| 2,896,229 | 7/59 | Doherty | 12—116.2 X |

JORDAN FRANKLIN, *Primary Examiner.*